(12) United States Patent
Lingg

(10) Patent No.: US 12,305,406 B2
(45) Date of Patent: May 20, 2025

(54) AREA COVERING ELEMENT

(71) Applicant: Li&Co AG, Mustair (CH)

(72) Inventor: Edwin Lingg, Schluderns (IT)

(73) Assignee: Li & Co AG, Mustair (CH)

( * ) Notice: Subject to any disclaimer, the term of this patent is extended or adjusted under 35 U.S.C. 154(b) by 0 days.

(21) Appl. No.: 17/990,240

(22) Filed: Nov. 18, 2022

(65) Prior Publication Data

US 2023/0079721 A1 Mar. 16, 2023

Related U.S. Application Data

(63) Continuation of application No. 17/279,128, filed as application No. PCT/EP2019/076281 on Sep. 27, 2019, now Pat. No. 11,649,643.

(30) Foreign Application Priority Data

Sep. 27, 2018 (DE) ..................... 10 2018 123 929.7

(51) Int. Cl.
*E04F 15/02* (2006.01)
*E04F 15/04* (2006.01)
(Continued)

(52) U.S. Cl.
CPC ...... *E04F 15/02183* (2013.01); *E04F 15/041* (2013.01); *E04F 15/10* (2013.01);
(Continued)

(58) Field of Classification Search
CPC ... E04F 15/02183; E04F 15/041; E04F 15/10; B32B 21/02; B32B 21/08; B32B 27/08;
(Continued)

(56) References Cited

U.S. PATENT DOCUMENTS

| 3,226,284 A | 12/1965 | Curtis |
| 5,108,094 A | 4/1992 | Quinn et al. |
| (Continued) | | |

FOREIGN PATENT DOCUMENTS

| CN | 104314278 A | * | 1/2015 |
| CN | 105415476 A | | 3/2016 |
| (Continued) | | | |

OTHER PUBLICATIONS

Internet definition of the term "bonded" from Oxford languages.*

*Primary Examiner* — Adriana Figueroa
(74) *Attorney, Agent, or Firm* — The Webb Law Firm

(57) ABSTRACT

The invention relates to an area covering element including at least one sheet-like carrier core, at least one protective layer and a decorative layer arranged between the sheet-like carrier core and the at least one protective layer. The sheet-like carrier core consists in this case of a strong, load-bearing carrier material and has at least an upper side and an underside arranged opposite from the upper side and also at least a first and second side face, arranged opposite from one another and respectively joining the upper side and underside. The decorative layer is formed by a printed film, which is firmly connected to the carrier core, the printed film at least partially covering at least the upper side and the first and second side faces of the sheet-like carrier core and the protective layer covering the full surface area at least of the printed film connected to the carrier core.

21 Claims, 7 Drawing Sheets

(51) Int. Cl.
*E04F 15/10* (2006.01)
*B32B 3/04* (2006.01)
*B32B 7/12* (2006.01)
*B32B 21/02* (2006.01)
*B32B 21/08* (2006.01)
*B32B 27/08* (2006.01)
*B32B 27/30* (2006.01)

(52) U.S. Cl.
CPC . *B32B 3/04* (2013.01); *B32B 7/12* (2013.01); *B32B 21/02* (2013.01); *B32B 21/08* (2013.01); *B32B 27/08* (2013.01); *B32B 27/304* (2013.01); *B32B 2307/412* (2013.01)

(58) Field of Classification Search
CPC ............ B32B 27/304; B32B 2307/412; B32B 2307/732; B32B 2255/10; B32B 2307/4023; B32B 2307/75; B32B 2419/06; B32B 2451/00; B32B 2471/00; B32B 21/00; B32B 3/04; B32B 7/12
See application file for complete search history.

(56) References Cited

U.S. PATENT DOCUMENTS

| | | | |
|---|---|---|---|
| 8,065,849 B2 | 11/2011 | Douglass | |
| 8,726,511 B2* | 5/2014 | Schulte | B27F 1/02 |
| | | | 29/897.32 |
| 8,833,028 B2 | 9/2014 | Whispell et al. | |
| 9,528,277 B2 | 12/2016 | Prati | |
| 10,336,032 B2* | 7/2019 | Hannig | B32B 27/12 |
| 2004/0050007 A1 | 3/2004 | Curatolo | |
| 2006/0032175 A1 | 2/2006 | Chen et al. | |
| 2007/0289705 A1* | 12/2007 | Johnson | B41M 7/0027 |
| | | | 156/277 |
| 2008/0282638 A1 | 11/2008 | Douglass | |
| 2009/0260313 A1* | 10/2009 | Segaert | B44C 5/043 |
| | | | 52/592.1 |
| 2009/0269522 A1* | 10/2009 | Liu | E04F 15/02 |
| | | | 428/33 |
| 2011/0042003 A1* | 2/2011 | Balmer | B32B 37/1284 |
| | | | 156/60 |
| 2015/0258845 A1* | 9/2015 | Hannig | B44C 5/04 |
| | | | 427/256 |
| 2016/0250835 A1 | 9/2016 | Pervan | |
| 2019/0003189 A1* | 1/2019 | Döhring | B32B 5/022 |

FOREIGN PATENT DOCUMENTS

| | | |
|---|---|---|
| DE | 10001227 C1 | 5/2001 |
| EP | 2708675 A1 | 3/2014 |
| EP | 2839094 B1 | 2/2015 |
| JP | H7279366 A | 10/1995 |
| JP | H8300595 A | 11/1996 |
| JP | 2001234016 A | 8/2001 |
| JP | 200452326 A | 2/2004 |
| JP | 2006283344 A | 10/2006 |
| JP | 2006328840 A | 12/2006 |
| JP | 2008057131 A | 3/2008 |
| WO | 2006033706 A1 | 3/2006 |
| WO | 2017217519 A1 | 12/2017 |

* cited by examiner

AREA COVERING ELEMENT

CROSS-REFERENCE TO RELATED APPLICATIONS

This application is a continuation of U.S. patent application Ser. No. 17/279,128 which is the United States National Phase of International Application No. PCT/EP2019/076281 filed Sep. 27, 2019, and claims priority to German Patent Application No. 102018123929.7 filed Sep. 27, 2018, the disclosures of which are hereby incorporated by reference in their entirety.

BACKGROUND OF THE INVENTION

Field of the Invention

The present invention relates to an area covering element for ceiling, wall or floor coverings, in particular an area covering element for outdoors.

Description of Related Art

Area coverings for outdoors are generally formed as floor coverings, in particular deckings or floors of open areas or else an area covering for areas that can be walked over and possibly also partly driven over by vehicles. The area coverings are in this case made up of a number of area covering elements, which are for example laid in the manner of paving stones in an interlocking formation and/or by way of tongue-and-groove connections or so-called snap-in connections, for example also on existing substructures, such as system-profile substructures, together to form an arrangement, to be specific connected to form the floor covering.

Deckings or floor coverings for outdoors have so far been made up of floor covering elements that are generally composed of planks or boards of a plastic composite, wood composite or bamboo composite. These known deckings often have the disadvantage that they react strongly to temperature fluctuations, and consequently are not dimensionally stable. In the case of deckings of which the floor covering elements are made of wood, for example produced from types of softwood or tropical wood, there is additionally the disadvantage that they require a high level of care, undergo colour loss or bleaching and tend to splinter over time. These floor coverings are then no longer suitable for walking-on barefoot. Deckings with floor covering elements of solid wood materials or composite wood materials are also only weather-resistant to a certain extent or not at all. There is also generally the disadvantage that only a restricted number of possible designs are available.

In order to be able to obviate some of the aforementioned disadvantages of floor coverings for outdoors known thus far, EP 2 839 094 B1 discloses a floor covering that is made up of a number of prefabricated floor covering elements, each floor covering element consisting of a rigid base, which is covered on an upper side with a vinyl fabric. However, also in the case of the floor covering from EP 2 839 094 B1, there is disadvantageously the problem that the choice of possible designs remains limited.

SUMMARY OF THE INVENTION

The object of the present invention is therefore to further develop a floor covering element in such a way that it can be individually configured, and in particular is resistant and insensitive to moisture, temperature change and the effect of light.

This object is achieved according to the invention by an area covering element with the features as described herein. The object is also achieved by a method for producing an area covering element as described herein. Advantageous developments of the invention are the subject of the assigned dependent claims.

The present invention provides an area covering element which comprises at least one sheet-like carrier core, at least one protective layer and a decorative layer arranged between the sheet-like carrier core and the at least one protective layer. The sheet-like carrier core consists in this case of a strong, load-bearing carrier material and has at least an upper side, an underside arranged opposite from the upper side and also at least a first and second side face, arranged opposite from one another and respectively joining the upper side and underside. The invention is distinguished in particular by the fact that the decorative layer is formed by a printed film, which is firmly connected to the carrier core. According to the invention, the printed film in this case at least partially covers at least the upper side and at least the first and second side faces of the sheet-like carrier core. The protective layer in turn covers the full surface area at least of the printed film connected to the carrier core.

The present area covering element should be understood as meaning a substantially cuboidal area covering element, in particular a substantially rectangular cuboidal area covering element, also referred to as a rectangular area covering element, for indoors and outdoors, in particular a floor covering element, which is designed for laying on areas, preferably on floor areas. Alternatively, the area covering element may be used to cover walls, ceilings, and/or objects, like furniture. In particular, in case the area covering element is used as floor covering element, the floor covering element is designed for laying in an interlocking formation and can therefore also be understood within the context of the present invention as a paving element or paving stone. In particular, the area covering element is to be understood within the context of the present invention as a paving element or paving stone for indoors and outdoors, for example as an area covering element for a decking or for example as an area covering element for an indoor floor exposed to the effects of moisture and/or temperature. Optionally, snap-in connection devices, such as tongue-and-groove elements, may also be provided laterally on the substantially cuboidal area covering elements for laying. It is similarly conceivable that a laying grid is provided on the underside.

The present invention allows a high degree of flexibility and range of variation for the design of area covering elements, in particular for outdoors, since the use of a printed film as a decorative layer advantageously allows a great number of extremely different decorations and designs to be created inexpensively and in a simplified way, to be precise particularly advantageously independently of the carrier material of the sheet-like carrier core.

The sheet-like carrier core, also referred to as a plate-like carrier core, consists of a strong, load-bearing carrier material, which is typically in particular dimensionally stable, so that fluctuations of temperature- and/or weather-dependent variables, bending and so-called "warping" can already be largely prevented by the carrier material itself. The resistance and dimensional stability are additionally improved by the firm connection of the printed film to the carrier core and also on account of the protective layer covering the printed film, so that the area covering element according to the invention is quite particularly advantageously both insensitive to thermal loads and insensitive to moisture, and is to a great extent light-fast and resistant to UV rays. The carrier core may be rigid, semi-rigid, or flexible. The rigidity of the carrier core typically depends on the combination of the material composition of the carrier core and the structure of the carrier-core.

The fact that, in addition to the upper side of the carrier core, both the printed film and the protective layer also cover at least the first and second side faces thereof, lying opposite one another, on the one hand advantageously achieves the effect that there is no visual break in the decoration of the surface in an area covering consisting of a number of area covering elements according to the invention laid in an interlocking formation. On the other hand, lifting up or detachment or peeling off of the decorative layer is also effectively avoided. The decorative layer in the form of a printed film in this case allows flexible creative possibilities as a result of providing a great freedom of design. Also, the printed film allows the surface of the area covering elements on the surface of a floor covering defining the tread area to be formed in particular also as an unstructured, smooth surface.

With preference, the printed film covers at least the upper side and the underside and also the first and second side faces of the sheet-like carrier core at least partially. In such a preferred embodiment, the printed film and the protective layer also extend over at least a region of the underside of the carrier core, whereby an even better hold of the layers mentioned on the carrier core is brought about and the resistance and dimensional stability of the entire area covering element can be increased further.

The printed film forming the decorative layer preferably has a thickness in a range from 70 to 300 μm. The thickness of the printed film, which in the present case is also referred to as the thickness or film thickness, consequently defines a layer thickness of the decorative layer. With preference, the thickness of the printed film, and consequently the layer thickness of the decorative layer, lies between 80 μm and 250 μm, with particular preference in a range from 100 μm to 200 μm and in particular with preference is around 90 μm or around 150 μm.

According to a most particularly preferred embodiment, the printed film completely covers the upper side and the underside and also the first and second side faces of the sheet-like carrier core. Consequently, the carrier core is enveloped by the printed film in such a way that the printed film, and consequently together with it also the protective layer, are arranged all around the carrier core. This is also understood in the present case as meaning that the carrier core is enclosed.

For example, the printed film may in this case be placed as a two-dimensional film element onto the carrier core and wrapped around it, the edges of the two-dimensional film element being arranged for example up against one another or overlapping, before the protective layer is applied. In this case, it is also conceivable to weld the edges of the printed film, whereby the stability can be additionally increased. Alternatively, a corresponding tube-like printed film could also be pushed or pulled onto the carrier core.

For example, the printed film may furthermore extend at least partially over oppositely arranged third and fourth side faces of the sheet-like carrier core. In such an embodiment, the carrier core is consequently covered on all sides by the printed film and the protective layer. Most particularly advantageously, in this case all six sides of the area covering element are completely covered by the printed film and the protective layer, so that the carrier core is enveloped or enclosed completely and over its full surface area.

In a preferred embodiment, the protective layer may be formed by a surface coating. Such a surface coating may for example be a suitable lacquer, which is at least applied on the outside to the printed film connected to the carrier core, to be precise to a visible side facing away from the carrier core. In particular, UV-curable lacquers are conceivable for this. Such a suitable lacquer may optionally also contain certain additives, such as for example waxes or corundum, whereby certain properties of the surface coating, such as scratch proofness, resistance, hardness, elasticity or the like can be influenced and adapted to corresponding requirements.

In an embodiment as an alternative to this, the protective layer is formed by a transparent useful layer, in particular a transparent protective film. With most particular preference, in this case the useful layer, in particular the transparent protective film, is adhesively bonded to the printed film by way of at least one layer of adhesive substance. Such a transparent protective film is preferably a transparent film of plastic. The preferred layer of adhesive substance may be applied in the form of a suitable viscous or liquid adhesive substance first on the outside to the printed film connected to the carrier core and optionally also to areas of the carrier core that are not covered by the printed film, and, depending on the type of adhesive substance, optionally cured in order finally to provide and attach the protective film correspondingly. Alternatively, in the case of such a variant of the embodiment, it would also be conceivable to connect the printed film and the transparent protective film in advance and to apply these connected films together to the carrier core. In a way similar to the printed film, the transparent protective film may also have a thickness in a range from 70 μm to 300 μm, with preference between 80 μm and 250 μm, with particular preference between 90 μm and 200 μm and in particular with preference between 100 μm and 150 μm.

A wide variety of materials or material mixtures or composite materials are suitable as carrier material for the sheet-like carrier core. Preferably, the carrier material of the sheet-like carrier core comprises a wood or a wood material, natural wood or a thermally treated wood or resin-impregnated wood being used with particular preference as the carrier material. Wood-fibre materials, in particular medium-density or high-density fibreboards (MDF boards or HDF boards), may also be used as carrier material.

Similarly with preference, the carrier material of the sheet-like carrier core comprises a plastic or a plastic composite material, for example wood-plastic composite (WPC), a composite of a plastic material and a non-plastic material, or a mineral plastic composite material or a mineral material. For example, the carrier core may at least partially be formed from mineral carrier material, such as magnesium oxide, wherein, preferably, the carrier core contains at least one mineral pressed together to form a board by an adhesive agent, for example a polymeric adhesive agent. The aforementioned plastic material is preferably a thermoplastic polymer. Suitable here as the plastic material are in particular plastics such as polypropylene (PP), polyethylene (PE), polyurethane (PU), polyvinylchloride (PVC), polyolefins or polyesters. The pressing may be performed while cold or possibly under a thermal effect. Particles, in particular polymer fibres or natural fibres, may serve as the adhesive material and stabilizers, which then lead to a good adhesive bonding (consolidating) of the mineral particles, in particular under the effect of temperature and pressure, in particular if they are in the form of fibres. The fibres may be loose fibers and/or interconnected fibers, preferably a fiber based woven layer and/or unwoven layer. It is imaginable that the carrier core comprises different material layers having a distinctive material composition and/or distinctive structure (such as a distinctive density). The carrier core is typically solid, but may also be at least partially foamed and/or hollow.

Carrier cores produced from the carrier materials mentioned have proven to be very water-resistant and thermally resistant and especially mechanically stable. Moreover, the decorative layer formed by a printed film can be connected well to the surface of such a carrier core.

With preference, the printed film is a film printed by means of digital printing, the production of the printed film, to be specific the printing of a suitable film, taking place by printing ink that contains a colour pigment being printed directly onto the film. In principle, laser or inkjet printing processes come into consideration for the digital printing, and so-called electronic ink processes can also be used. Advantageously, the production of the printed film by means of digital printing is in particular low-cost and also suitable for very small batches, so that a wide variety of decorative layers can be produced flexibly and inexpensively according to demand or according to individual specifications or customer requirements.

Alternatively, the printed film may however also be printed by means of direct printing or by means of indirect printing or else by means of other printing processes, such as for example screen printing processes, roller printing processes, gravure printing processes or the like.

With preference, the printed film is produced from a plastic, in particular from a thermoplastic polymer. Suitable here as the plastic material are in particular plastics such as polypropylene (PP), polyethylene (PE), polyurethane (PU), polyvinylchloride (PVC), polyolefins or polyesters.

However, the printed film may alternatively also be produced from other suitable materials, such as for example paper, impregnated paper, paper-based mixed material or from other suitable materials.

According to a particularly preferred embodiment, the printed film is adhesively bonded to the sheet-like carrier core, at least one layer of adhesive being arranged between the printed film and the sheet-like carrier core. A firm, stable connection can be established and a great resistance of the connection can be achieved in particular by a layer of adhesive that covers the surface area or the full surface area. The risk of the printed film becoming detached or peeling off is thereby also reduced to a minimum. Selecting a suitable adhesive for the layer of adhesive in particular also allows for example the different materials of the carrier core and the printed film to be durably connected.

With preference, furthermore at least one layer of bonding agent is arranged between the sheet-like carrier core and the layer of adhesive and/or between the layer of adhesive and the printed film. The layer of bonding agent consists in this case of a bonding agent, which in the present case may also be referred to as a primer and, in particular in the case of poorly adhesively bondable materials of the sheet-like carrier core and the printed film, forms a bonding bridge between the respective material and the layer of adhesive and thereby improves the bond. In particular on account of the high requirements that the area covering element intended for outdoors has to meet, to be specific a great resistance to dampness and/or wet and a great resistance to temperature, the layer of bonding agent also provides particular advantages by improving the bond.

It is advantageous in case that underside of the carrier core is provided with at least one primer layer. Said primer layer typically further strengthens the area covering element, and/or renders the area covering element more durable. Preferably, the primer layer applied to the underside and possibly to further sides of the carrier core is a water-impermeable (moisture-impermeable) layer. Preferably, the primer layer applied to the underside and/or possibly to further sides of the carrier core protects the carrier core against moisture and/or the infestation of termites (or other insects). It is also conceivable that the printed film is configured to protect the carrier core against moisture and/or the infestation of termites (or other insects). In addition to (and on top of) the primer layer and/or instead of the primer layer the underside may be provided with a backing layer, such as a cork layer and/or foamed layer, and/or elastic layer.

Depending on whether the area covering element is used as a wall covering, ceiling covering or floor covering, or where the floor covering is arranged, for example in a private household or used in commercial premises, or is self-supporting or rests over its full surface area on a base, the carrier core may preferably have a thickness of between 2 and 20 mm or between 3 and 30 mm, with preference a thickness in a range from 5 to 25 mm, with particular preference in a range from 7 to 22 mm and in particular a thickness of between 10 and 15 mm. With most particular preference, the sheet-like carrier core has a thickness of around 8 mm or of around 12 mm or of around 18 mm.

The present invention also provides a method for producing an area covering element, in the method at least one decorative layer that is formed by a printed film being applied to a sheet-like carrier core of a strong, load-bearing carrier material. For this purpose, the printed film is first arranged on the sheet-like carrier core in such a way that at least an upper side and in each case at least a first and second side face, arranged opposite from one another, of the sheet-like carrier core are at least partially covered by the printed film. The printed film is then firmly connected to the carrier core and subsequently at least one protective layer is applied in such a way that at least the printed film connected to the carrier core is covered over its full surface area by the protective layer.

All of the advantages and particular features already described above in conjunction with the area covering element apply equally to the method and at this stage are no longer explicitly stated.

With preference, the printed film is adhesively attached at least on the upper side and the first and second side faces of the sheet-like carrier core, for this purpose a layer of adhesive being applied at least to the upper side and the first and second side faces of the sheet-like carrier core before the application of the printed film. Preferably, the printed film covers the substantially complete first and second side faces of the carrier core. Preferably, the printed film extends to or towards the underside of the carrier core. Preferably, the printed film extends to a level below optional one or more (optional) interlocking devices, also referred to as coupling profiles, such as tongue-and-groove elements (as seen from a top view of the area covering element). This could further protect the area covering elements, in particular in an interlocked condition of a plurality of these area covering elements. It is imaginable that at least two, or all, opposite side faces of the area covering element are provided with complementary coupling profiles, being coupling profiles that are designed to co-act with each other in order to interlock adjacent area covering elements. It is, however, also imaginable that merely a single side face of an area covering element (type A) is provided with a coupling profile, and that a single side face of another area covering element (type B) is provided with a complementary coupling profile. It is, however, also imaginable that opposite side faces of an area covering element (type A) are provided with a first coupling profile, and that opposite side faces of another area covering element (type B) are provided with a complementary coupling profile. It is imaginable that at least one first coupling profile is located at the first side face of the carrier core and/or that at least one second coupling profile, configured to co-act with a first coupling profile of an adjacent area covering element, is located at the second side face of the carrier core. This typically leads to the situation that the printed film overlaps with the first coupling profile and/or the second coupling profile. This could be realized by shaping the printed film according to the contour of the first coupling profile and/or second profile. Alternatively, optionally additionally, this could be realized by disrupting (opening) the printed film at the location of at least a part of the first coupling profile and/or at least a part of the second coupling profile. In addition to the first side face and the opposite second side face, the carrier core typically also comprises, at two other opposite side faces, a third side face and a fourth side face. In a preferred embodiment, the printed film covers merely at least a part of the upper side, at least a part of the first side face, and at least a part of the second side face of the carrier core, and optionally the underside of the carrier core. This means that the third side face and the fourth side face are left uncovered by the printed film. In this latter case, it could be advantageous that a first coupling profile is applied to the third side face and a second coupling profile is applied to the fourth side face, and that the first and second side faces (covered by the printed film) are free of any coupling profile. This leads to an embodiment which is relatively easy to produce, while the first and second side faces are well protected by the printed film, and wherein the coupling profiles at the third and fourth side faces can be optimized for a reliable coupling between adjacent area covering elements. It is, however, also imaginable, that each side face is provided with a coupling profile. More in particular, it is imaginable that the first side face is provided with at least one first coupling profile, that the second side face is provided with at least one second coupling profile, that the third side face is provided with at least one third coupling profile, and that the first side face is provided with at least one first coupling profile. Typically, in this case each coupling profile is complementary (meaning configured to co-act) to at least one other coupling profile. Each coupling profile may be different compared the other coupling profiles. It is also thinkable that at least two coupling profiles at least two different side faces of an area covering element are identical.

According to a preferred development of the invention, the sheet-like carrier core is enclosed with the printed film, for this purpose the printed film being arranged on the sheet-like carrier core in such a way that not only the upper side and the first and second side faces but also an underside of the sheet-like carrier core are completely covered by the printed film.

The invention is further elucidated by way of the following sixteen non-limitative clauses:

Clause 1: An area covering element (1) comprising at least one sheet-like carrier core (2), at least one protective layer (4) and a decorative layer (3) arranged between the sheet-like carrier core (2) and the at least one protective layer (4), the sheet-like carrier core (2) consisting of a strong, load-bearing carrier material and having at least an upper side (5) and an underside (6) arranged opposite from the upper side (5) and also at least a first and second side face (7, 8), arranged opposite from one another and respectively joining the upper side and underside (5, 6), characterized in that the decorative layer (3) is formed by a printed film, which is firmly connected to the carrier core (2), the printed film (3) at least partially covering at least the upper side (5) and the first and second side faces (7, 8) of the sheet-like carrier core (2) and the protective layer (4) covering the full surface area at least of the printed film connected to the carrier core (2).

Clause 2: The area covering element (1) according to clause 1, characterized in that the printed film at least partially covers at least the upper side (5) and the underside (6) and also the first and second side faces (7, 8) of the sheet-like carrier core (2).

Clause 3: The area covering element (1) according to clause 2, characterized in that the printed film completely covers the upper side (5) and the underside (6) and also the first and second side faces (7, 8) of the sheet-like carrier core (2).

Clause 4: The area covering element (1) according to one of clauses 1 to 3, characterized in that the printed film furthermore extends at least partially over oppositely arranged third and fourth side faces of the sheet-like carrier core (2).

Clause 5: The area covering element (1) according to one of the preceding clauses, characterized in that the protective layer (4) is formed by a surface coating.

Clause 6: The area covering element (1) according to one of clauses 1 to 4, characterized in that the protective layer (4) is formed by a transparent useful layer, in particular a transparent protective film.

Clause 7: The area covering element (1) according to clause 6, characterized in that the useful layer, in particular the transparent protective film, is adhesively bonded to the printed film (3) by way of at least one layer of adhesive substance (11).

Clause 8: The area covering element (1) according to one of the preceding clauses, characterized in that the carrier material of the sheet-like carrier core (2) comprises a wood, a wood material, a plastic, a plastic composite material, a mineral plastic composite material or a mineral material.

Clause 9: The area covering element (1) according to one of the preceding clauses, characterized in that the printed film is a film printed by means of digital printing.

Clause 10: The area covering element (1) according to one of the preceding clauses, characterized in that the printed film is produced from a plastic, in particular from a thermoplastic polymer.

Clause 11: The area covering element (1) according to one of the preceding clauses, characterized in that the printed film is adhesively bonded to the sheet-like carrier core (2), at least one layer of adhesive (9) being arranged between the printed film (3) and the sheet-like carrier core (2).

Clause 12: The area covering element (1) according to Clause 11, characterized in that furthermore at least one layer of bonding agent (10) is arranged between the sheet-like carrier core (2) and the layer of adhesive (9) and/or between the layer of adhesive (9) and the printed film (3).

Clause 13: The area covering element (1) according to one of the preceding clauses, in which the sheet-like carrier core (2) has a thickness of between 2 and 25 mm, in particular a thickness of between 10 and 20 mm.

Clause 14: A method for producing an area covering element (1), in which at least one decorative layer (3) that is formed by a printed film is applied to a sheet-like carrier core (2) of a strong, load-bearing carrier material, for this purpose the printed film (3) being arranged on the sheet-like carrier core (2) in such a way that at least an upper side (5) and at least a first and second side face (7, 8) of the sheet-like carrier core (2) are at least partially covered by the printed film (3) and the printed film (3) being firmly connected to the carrier core (2) and subsequently at least one protective layer (4) being applied in such a way that at least the printed film (3) connected to the carrier core (2) is covered over its full surface area by the protective layer (4).

Clause 15: The method according to clause 14, characterized in that the printed film (3) is adhesively attached at least on the upper side (5) and the first and second side faces (7, 8) of the sheet-like carrier core (2), for this purpose a layer of adhesive (10) being applied at least to the upper side (5) and the first and second side faces (7, 8) of the sheet-like carrier core (2) before the application of the printed film (3).

Clause 16: The method according to clause 14 or clause 15, characterized in that the sheet-like carrier core (2) is enclosed with the printed film (3), for this purpose the printed film (3) being arranged on the sheet-like carrier core (2) in such a way that not only the upper side (5) and the first and second side faces (7, 8) but also an underside (6) of the sheet-like carrier core (2) are completely covered by the printed film (3).

BRIEF DESCRIPTION OF THE DRAWINGS

The invention is described below for example on the basis of the schematic drawing, in which.

DESCRIPTION OF THE INVENTION

Figure 1:
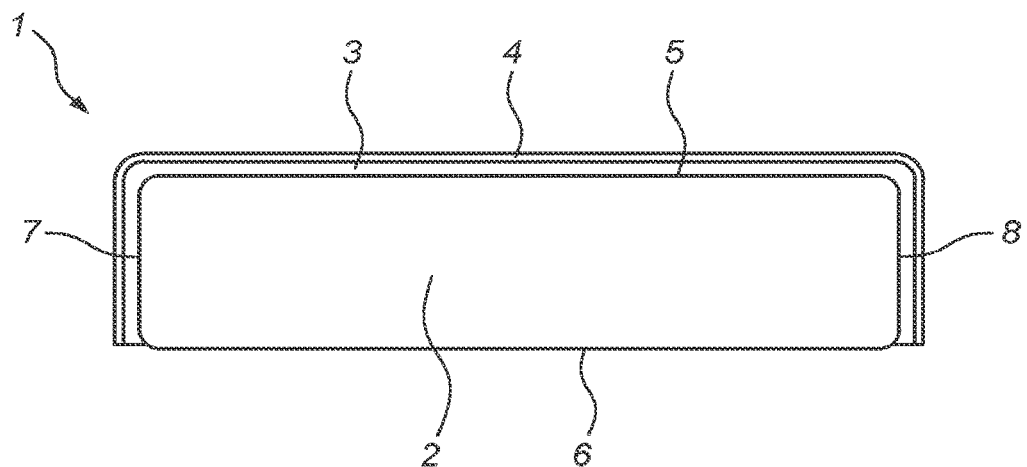
FIG. 1 shows in a basic schematically represented manner a lateral view of an embodiment of the area covering element according to the invention.

FIG. 1 shows in a lateral view a substantially cuboidal or sheet-like area covering element 1, which can be assembled with further area covering elements 1 over a surface area to form a floor covering, ceiling covering and/or wall covering indoors or outdoors, in particular outdoors. In particular, the area covering element 1 may be laid in an interlocking formation to form a decking.

The area covering element 1 comprises a sheet-like carrier core 2, which is formed substantially in a cuboidal manner and consists of a strong, load-bearing carrier material, for example of wood or of a wood-plastic composite material. The sheet-like carrier core 2 has at least an upper side 5, an underside 6 arranged opposite from the upper side 5 and also four side faces, respectively adjoining one another at right angles and joining the upper side and underside. In FIG. 1, only the first and second side faces 7, 8, which are arranged opposite from one another, are provided with designations. In the example shown, the sheet-like carrier core 2 has a thickness of around 20 mm.

The upper side 5 and the first and second side faces 7, 8 of the sheet-like carrier core 2 are covered by a decorative layer 3, which is formed by a printed film. The printed film 3 has a lower side, which is facing the sheet-like carrier core 2, and an upper side, which is opposite from the lower side and may also be referred to as the visible side. The printed film 3, which in the example shown is around 80 μm thick, is firmly connected by way of its lower side to the corresponding surface areas of the upper side 5 and of the first and second side faces 7, 8 of the sheet-like carrier core 2.

Also arranged on the upper side or visible side of the printed film 3 is a protective layer 4, which in the example shown is formed by a surface coating in the form of a transparent lacquer, it being possible for the lacquer to be applied to the upper side or visible side of the printed film 3 in a viscous or liquid form and subsequently cured. The protective layer 4 covers the full surface area of the printed film 3 connected to the carrier core 2. The visible side of the printed film 3 also remains visible through the lacquer. The region of the upper side 5 may also be understood as a visible surface or as an upper surface area of the area covering element 1, which in an assembled floor covering also corresponds to the tread area.

In the case of the example of FIG. 1, consequently three sides of the sheet-like carrier core 2 are covered by the printed film 3, and consequently along with it also by the protective layer 4, so that the sheet-like carrier core 2 in the present concept is covered or coated on three sides by the printed film 3 and the protective layer 4.

Figure 2:
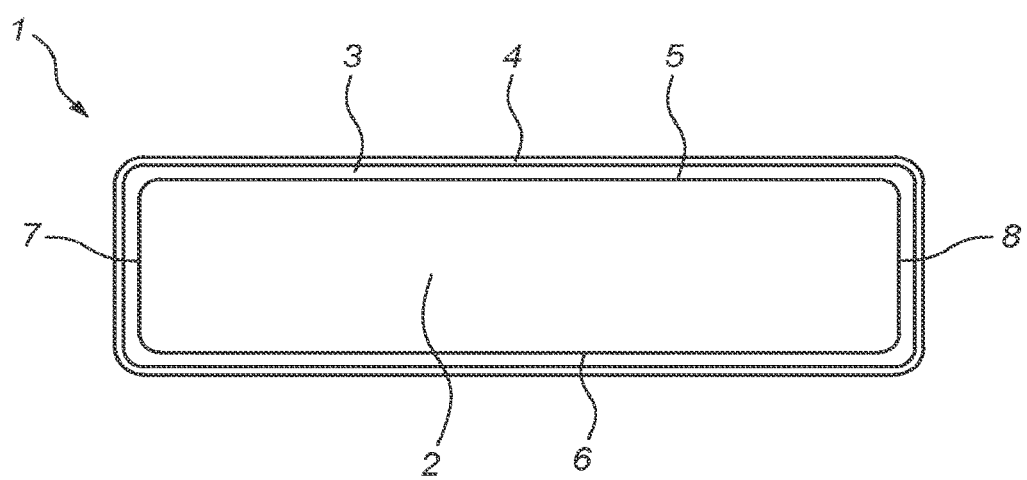
FIG. 2 shows in a basic schematically represented manner a lateral view of an alternative embodiment of the area covering element according to the invention.

FIG. 2 shows—likewise in a lateral view—a further embodiment of the sheet-like area covering element 1 according to the invention. The exemplary embodiment of FIG. 2 differs from that of FIG. 1 substantially in that, in addition to the upper side 5 and the first and second side faces 7, 8, the underside 6 of the sheet-like carrier core 2 is also completely covered by the printed film 3 and the protective layer 4. The carrier core 2 is consequently enveloped or enclosed all around by the printed film 3 and the protective layer 4.

Not shown in the figures, but possible as an alternative variant of the embodiment, the protective layer 4 may furthermore also be partially or completely applied on surface areas of the carrier core 2 that are not covered by printed film 3.

Figure 3:
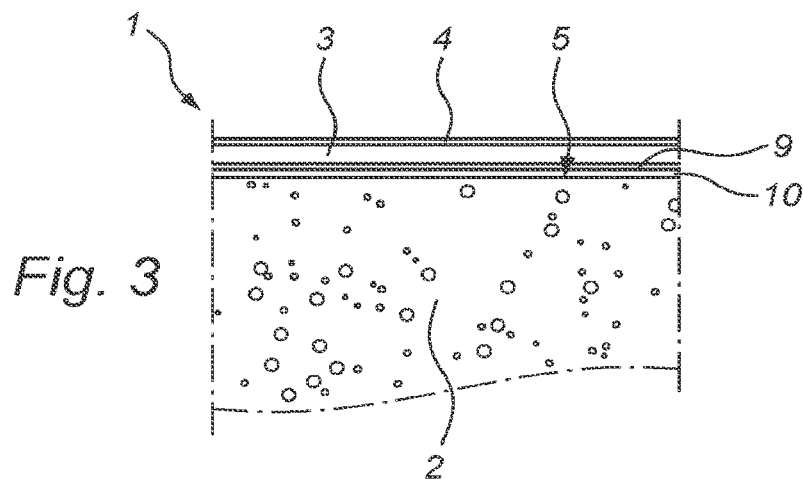
FIG. 3 shows in a schematic sectional representation a detail of a preferred embodiment of the area covering element.
Figure 4:
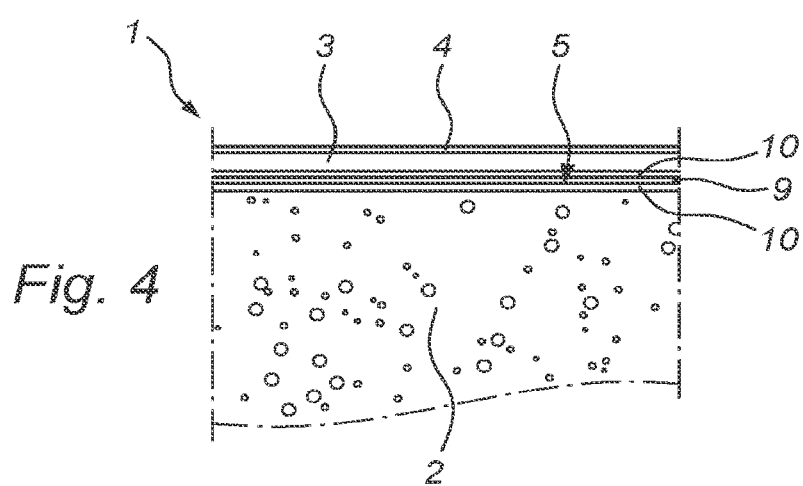
FIG. 4 shows in a schematic sectional representation a detail of a further preferred embodiment of the area covering element.
Figure 5:
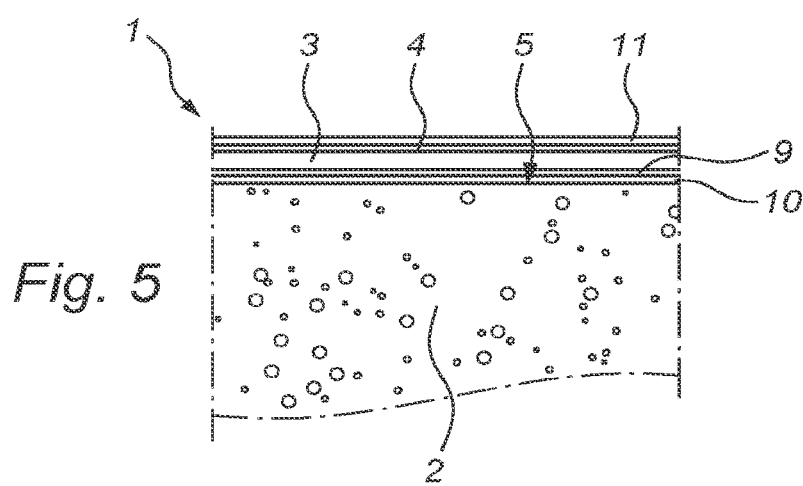
FIG. 5 shows in a schematic sectional representation a detail of yet another preferred embodiment of the area covering element.

FIGS. 3 to 5 show enlarged in a respective sectional representation a detail of different variants of the embodiment of the present area covering element 1, each of the variants shown being able to be realized both in the embodiment of FIG. 1 and in that of FIG. 2. In the case of all the variants shown according to FIGS. 3 to 5, the printed film 3 is adhesively bonded to the carrier core 2 by way of its lower side that is facing the carrier core 2. For the adhesive bonding, in each case a full-surface-area layer of adhesive 9 is arranged for this purpose between the carrier core 2 and the printed film 3. For an additionally improved bonding of the layer of adhesive 9 on the carrier material of the carrier core 2, provided directly on its surface is a layer of bonding agent 10, which is likewise applied over its full surface area and is consequently arranged between the surface of the carrier core 2 and the layer of adhesive 9.

In the case of the examples according to FIGS. 3 and 5, the layer of adhesive 9 is in this case chosen such that the attachment or bonding between the layer of adhesive 9 and the plastic material of the printed film 3 takes place optimally without any further precautions, so that the printed film 3 is connected by its lower side directly to the layer of adhesive 9. According to FIG. 4, as a difference from this, also arranged between the layer of adhesive 9 and the printed film 3 is a further layer of bonding agent 10 for improving the bonding.

In the case of the examples of FIGS. 3 and 4, the protective layer 4 is formed by a surface coating, to be specific by a transparent lacquer, which is applied directly to the visible side of the printed film 3 that is facing away from the carrier core 2 and is cured. By contrast, in the case of the example of FIG. 5, the protective layer 4 is formed by a transparent protective film, which is adhesively bonded to the visible side of the printed film 3 by way of a layer of adhesive substance 11.

FIGS. 6a-6d show in a schematic perspective representation different embodiments of area covering elements provided with one or more coupling profiles according to the invention. More in particular, these figures show different imaginable shapes of area covering elements according to the invention, wherein the depicted are covering elements are each provided with one or more coupling profiles allowing the area covering elements to be connected to one or more other area covering elements. Here, FIG. 6 shows a rectangular element 12 having at a first side face 12a a first coupling profile 13a, and having at an opposite second side face 12b a second coupling profile 13b. The first coupling profile 13a is configured to co-act with the second coupling profile 13b (of another (similar) area covering element). In this example, the first coupling profile 13a is formed by a groove extending along the first side face 12a and extending in a direction parallel to the plane defined by the area covering element 12, and the second coupling profile 13b is formed by a tongue extending along the second side face 12b of the area covering element 12 in a direction parallel to the plane defined by the area covering element 12. The tongue 12b could be clamped into the groove 12a to realize a vertical locking effect and—to some extent—a horizontal locking effect. A printed film, as for example shown in the previous figures, may cover the combination of the first face side 12a and the second face side 12b and/or the combination of a remaining third face side 12c and opposite fourth face side 12d. The printed film normally covers the complete upper side 12e of the covering element 12, and may also cover at least a part of the underside 12f of the covering element 12.

Figure 6A:
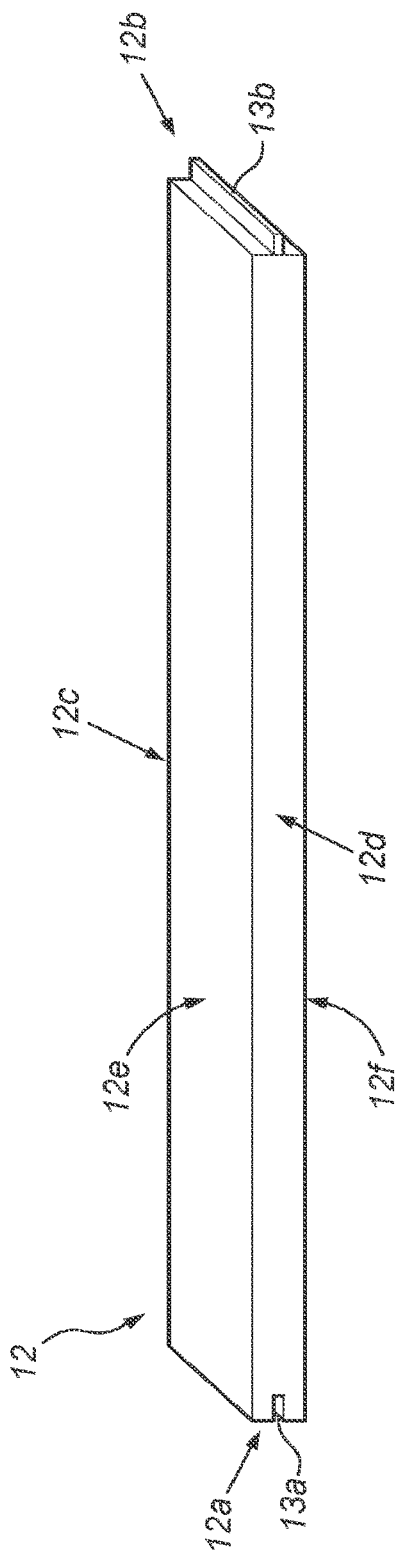
FIGS. 6a-6d show in a schematic perspective representation different embodiments of area covering elements provided with one or more coupling profiles according to the invention.
Figure 6B:
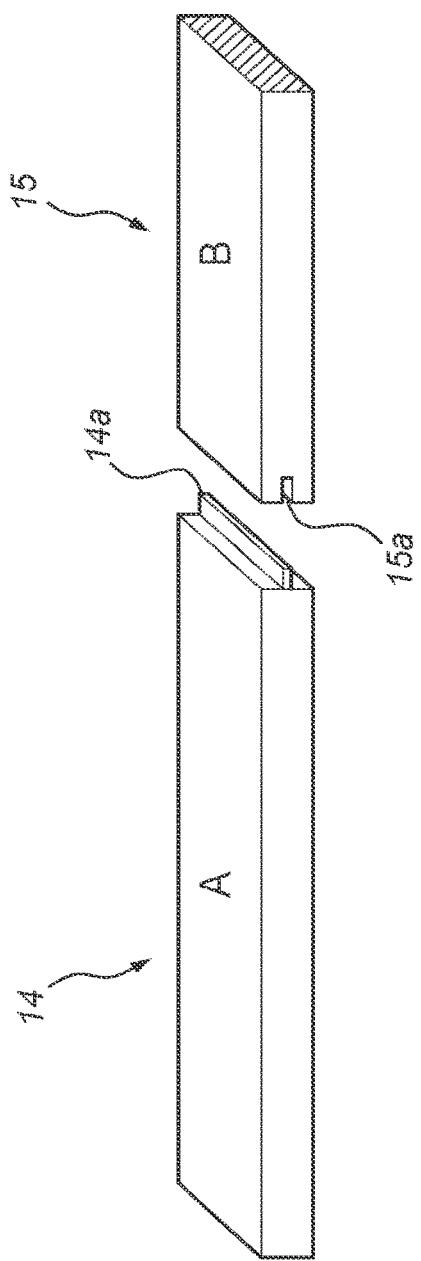

In FIG. 6b two different area covering elements 14, 15 (type A and type B) are shown, wherein each area covering elements 14, 15 is provided with a single coupling profile 14a, 15a, wherein the coupling profiles 14a, 15a of different covering elements 14, 15 are configured to co-act with each other.

Figure 6C:
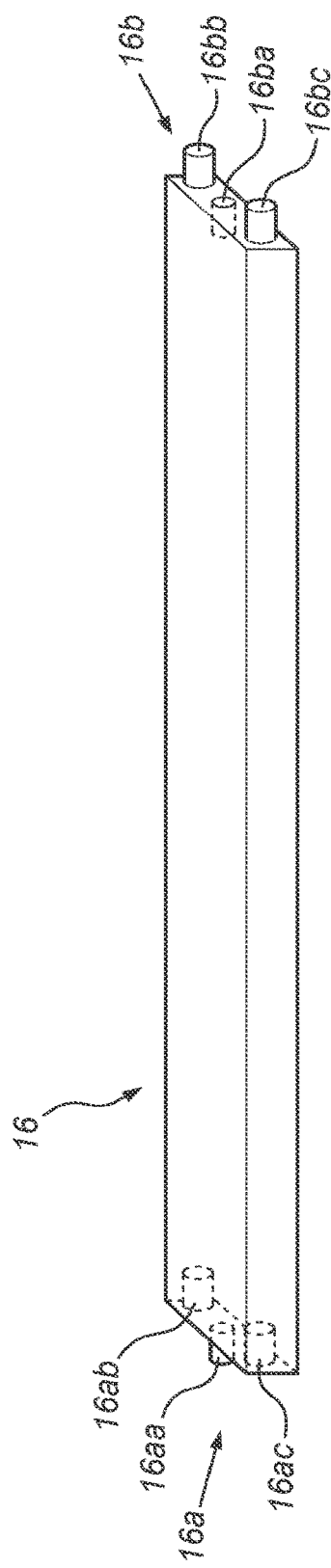
Figure 6D:
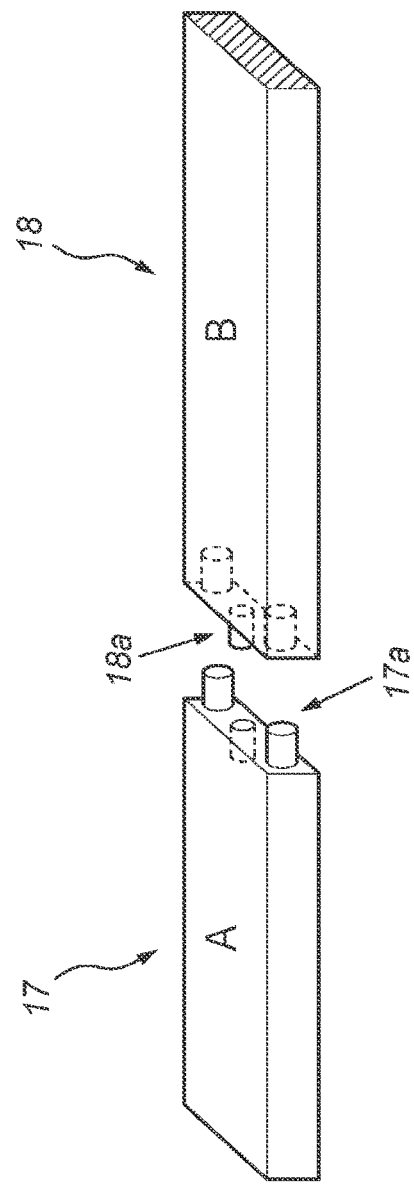

In FIG. 6c an area covering element 16 is shown which is provided with alternative complementary coupling profiles 16a, 16b. Here, a first coupling profile 16a comprises a pin or a tongue 16aa, and two holes 16ab, 16ac, and a second coupling profile 16b comprises a hole 16ba and two pins or tongues 16bb, 16bc. Since the coupling profiles 16a, 16b are configured to co-act with each other, different covering elements 16 can be connected (mechanically) with each other. In FIG. 6d an alternative embodiment is shown, wherein in fact two different area covering elements 17, 18 (type A and type B) are shown, wherein each area covering elements 17, 18 is provided with a single coupling profile 17a, 18a, wherein the coupling profiles 17a, 18a of different covering elements 17, 18 are configured to co-act with each other. It may be clear that instead of the shown configuration(s) other configurations of one or more holes and/or one or more tongues (or pins) can be applied at one or more side faces of the area covering element 16.

Figure 7:
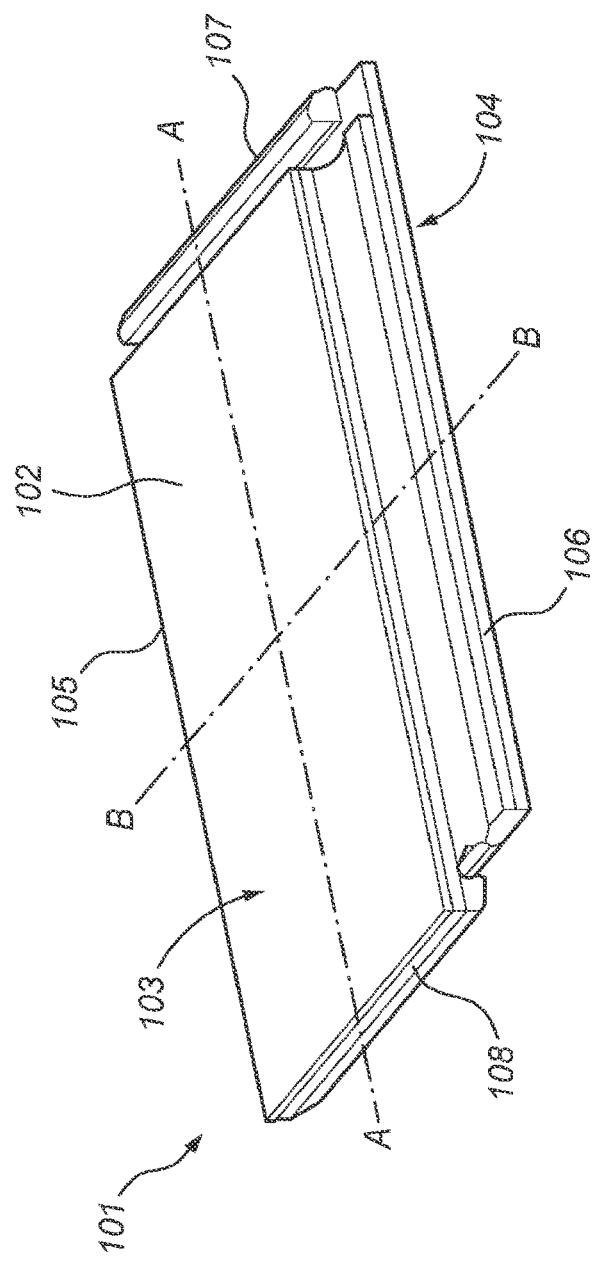
FIG. 7 shows a perspective view of a rectangular floor panel according to the present invention.

FIG. 7 shows a rectangular floor panel 101 according to the present invention. The panel 101 is interconnectable with similar panels for forming a covering, as will be shown in further figures. The floor panel 101 can be made of any material, though typical materials are wood, in particular HDF, MDF, and LDF, mineral and/or plastic, in particular thermoplastic, more in particular PVC. Commonly, the floor panel 101 is made of a laminate comprising a central layer (core layer) enclosed by a backing structure and a top structure (not shown). The top structure comprises a decorative layer which is typically formed by a printed film, on top of which a protective layer is applied. The panel 101 comprises a centrally located core 102 provided with an upper side 103 and a lower side 104. The core 102 is integrally connected with a first pair of opposite edges, in particular a first edge 105 and a complementary second edge 106, located at the long lateral sides of the panel 101. The core is also integrally connected with a second pair of opposite edges, in particular a third edge 107 and a complementary fourth edge 108, located at the short sides of the panel 101 in this exemplary embodiment. The decorative layer covers the upper side 103, and one or more side edges 105, 106, 107, 108, of the core 102 at least partially.

Figure 8:
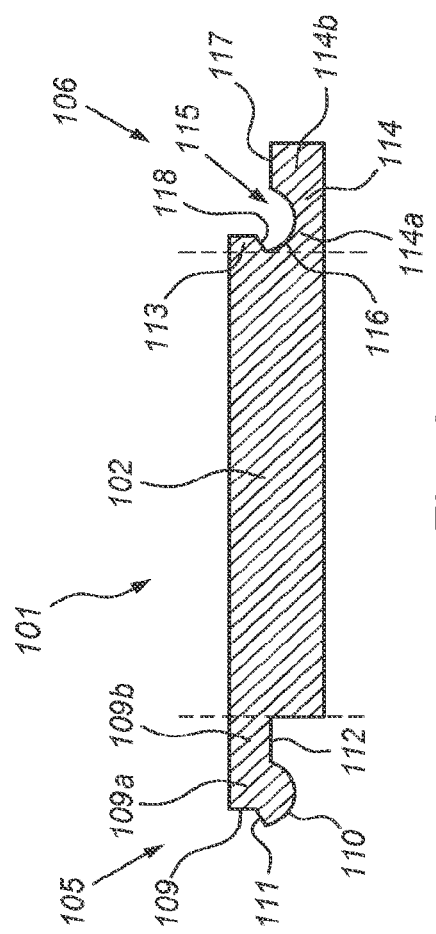
FIG. 8 shows a cross-sectional view indicated by section A-A in FIG. 7.

FIG. 8 is a cross-sectional view indicated by section A-A in FIG. 7. In this cross-section, the shape of the complementary first edge 105 and second 106 edge are shown in detail. The first edge 105 comprises a sideward tongue 109 which is integrally connected to the core 102. By means of the vertical dashed line the border between the sideward tongue 109 and the core 102 is visualised. A front region 109a of the sideward tongue 109 is provided with a rounded bottom surface 110. An outer end of the rounded bottom surface 110 adjoins an inclined locking surface 111. An opposite end of the rounded bottom surface 110 adjoins a bearing surface 112 making part of a back region 109b of the sideward tongue 109. The second edge 106 of the panel 101 comprises an upper lip 113 and a lower lip 114 defining a recess 115. Both lips 113, 114 are integrally connected to the core 102. By means of the vertical dashed line the border between the lips 113, 114 and the core is visualised. As shown in FIG. 8, the width of the upper lip 113 is substantially smaller than the width of the lower lip 114. The recess 115 has a shape which is complementary to the shape of the sideward tongue 109. More in particular, a top surface 116 of a back region 114a of the lower lip 114 has a (complementary) rounded shape, configured to co-act with the rounded front region 109a of the sideward tongue 109, while a front region 114b of the lower lip 114 is provided with an upwardly protruding shoulder 117, configured to co-act with the bearing surface 112 of the sideward tongue 109. A lower surface 118 of the upper lip 113 is inclined and corresponds to the locking surface 111 of the sideward tongue 109. Locking at the first edge 105 and the second edge 106 of adjacent panels 101 by insertion of the sideward tongue 109 of a panel 101 to be coupled into the recess 115, wherein said panel 101 is initially held in an inclined position. After insertion of the sideward tongue 109 into the recess, the panel 101 to be coupled will be pivoted (angled) in downward direction about an axis parallel to the first edge 105 until both panels 101 are positioned in the same—commonly horizontal—plane, wherein the locking surface 111 of the sideward tongue 9 will engage the locking surface of the upper lip 118, and wherein at least a bottom front part is accommodated substantially form-fittingly in the recess 115, and wherein the bearing surface 112 is supported by the shoulder 117. Locking at the first edge 105 and the second edge 106 leads to locking of the connected panels 101 in both horizontal direction and vertical direction. The angling down locking principle of the first and second edges 105, 106 is a relatively easy locking principle which facilitates mutual coupling of panels at these edges 105, 106 tremendously.

Figure 9:
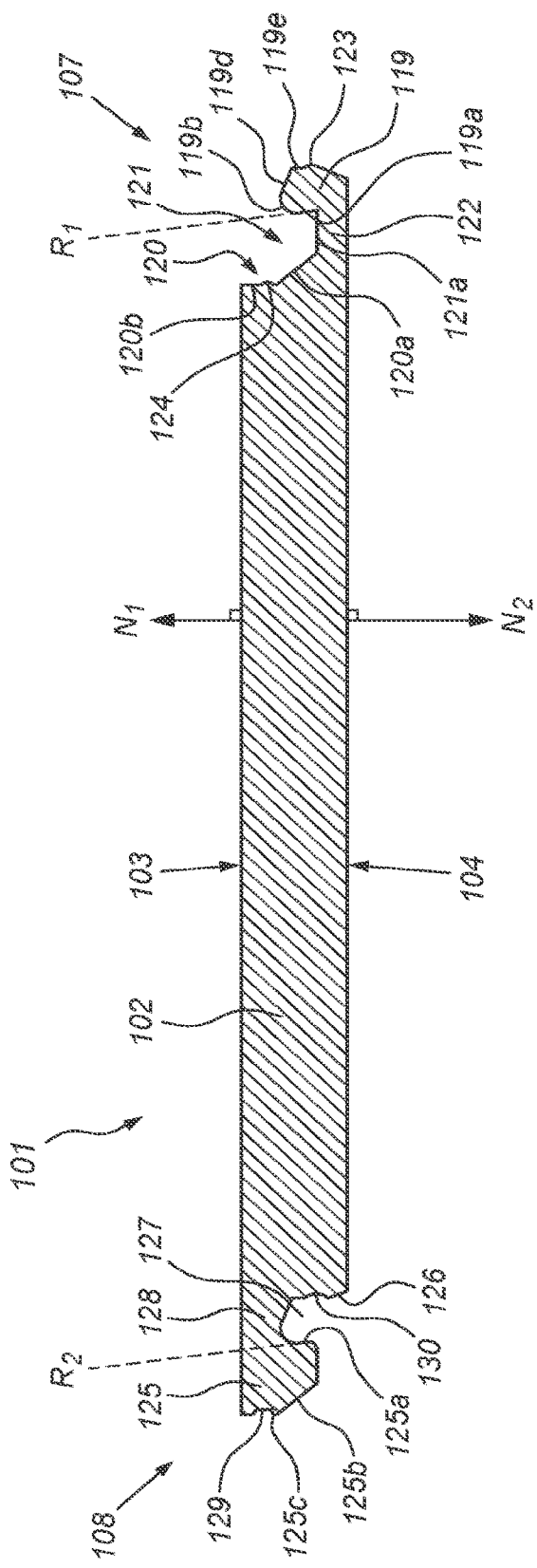
FIG. 9 is a cross-sectional view indicated by section B-B in FIG. 7.

FIG. 9 is a cross-sectional view indicated by section B-B in FIG. 7. In this cross-section, the shape of the complementary third edge 107 and second 108 edge are shown in detail. The third edge 107 comprises an upward tongue 119, an upward flank 120 and an upward groove 121 formed between upward tongue 119 and upward flank 120. The upward tongue 119 is connected to the core 102 by means of a bridge 122, which is preferably resilient to some extent. A side 119a of upward tongue 119 facing toward upward flank 120 extends in the direction of the normal $N_1$ of the upper side 103 of the core 102. The tangent $R_1$ and the normal $N_1$ of the upper side 103 of the core 102 are thus directed toward each other (converging orientation), wherein the angle enclosed by $R_1$ and $N_1$ is preferably between 0 and 10 degrees in this exemplary embodiment. Due to the converging orientation of the upward flank 120 and the side 119a of the upward tongue 119 facing toward to the upward flank 120, the upward groove 122 is a closed groove, which is only accessible to a complementary counterpart by deformation of the upward tongue 119 and/or bridge 122. Another side 119b of upward tongue 119 facing toward upward flank 120 forms or may form an aligning edge enabling facilitated realization of a coupling to an adjacent floor panel 101. As shown, this side 119b functioning as aligning edge is directed away from the normal $N_1$ of upper side 103 of the core 102. An upper side 119d of upward tongue 119 does however extend in the direction of the normal $N_1$ of the upper side 103 of the core 102, and runs inclining downward in the direction of the side 119e of upward tongue 119 facing away from upward flank 120. This chamfering provides the option of giving the complementary fourth edge 108 a more robust and therefore stronger form. A part of the side 119e of upward tongue 119 facing away from upward flank 120 is oriented substantially vertically and is moreover provided with an outward bulge 123. A lower part 120a of upward flank 120 is oriented diagonally, while an upper part 120b of upward flank 120 is shown to be substantially vertical and forms a stop surface for fourth edge 108. In between the inclined part 120a and the substantially vertical part 120b of the upward flank an additional coupling element, in particular an additional bulge 124, is provided. A lower wall part 121a of upward groove 121 is oriented substantially horizontally in this exemplary embodiment. The fourth edge 108 is substantially complementary to third edge 107. The fourth edge 108 comprises a downward tongue 125, a downward flank 126 and a downward groove 127 formed between downward tongue 125 and downward flank 126. The downward tongue 125 is connected to the core 102 by means of a bridge 128, which is preferably resilient to some extent. A side 125a of downward tongue 125 facing toward downward flank 126 lies in the direction of the normal $N_2$ of the lower side 104 of the core 102. This means that a tangent $R_2$ of side 125a of downward tongue 125 and the normal of the lower side 104 of the core 102 are mutually converging, wherein the angle enclosed by $R_2$ and $N_2$ is preferably between 0 and 10 degrees in this exemplary embodiment. More preferably, the inclination of $R_1$ is identical to the inclination of $R_2$; hence, $R_1$ and $R_2$ are preferably parallel. Due to the converging orientation of the downward flank 126 and the side 125a of the downward tongue 125 facing toward to the downward flank 126, the downward groove 127 is a closed groove, which is only accessible for the upward tongue 119 of an adjacent panel 101 by deformation of the downward tongue 125 and/or bridge 128, as a result of which the entrance of the downward groove can be widened (temporary). A side 125b of the downward tongue 125 facing away from downward flank 126 is diagonally oriented, but has a flatter orientation than the complementary side 120a of upward flank 120, whereby a gap (air space) will be formed in the coupled position, which will generally facilitate coupling between two floor panels 101. The inclining side 125b of downward tongue 125 also functions as aligning edge for the purpose of further facilitating coupling between two floor panels 101. Another side 125c facing away from downward flank 126 takes a substantially vertical form, though is provided with a small cavity 129 configured to co-act with the additional bulge 124 of another panel 101. A top part of the side 125c facing away from downward flank 126 forms a complementary stop surface for stop surface 120b of upward flank 120 (of an adjacent floor panel). Downward flank 126 is oriented substantially vertically and is provided with a recess 130 adapted to receive the outward bulge 123 of the upward tongue 119 (of an adjacent floor panel).

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

LIST OF DESIGNATIONS 1 area covering element
2 sheet-like carrier core
3 decorative layer—printed film
4 protective layer
5 upper side
6 underside
7 first side face
8 second side face
9 layer of adhesive
10 layer of bonding agent
11 layer of adhesive substance

What is claimed:

1. An area covering element comprising:
at least one carrier core,
at least one protective layer and a decorative layer arranged between the carrier core and the at least one protective layer,
the carrier core consisting of a strong, load-bearing carrier material and having at least an upper side and an underside arranged opposite from the upper side and at least first and second side faces, arranged opposite from one another and respectively joining the upper side and the underside, and at least third and fourth side faces, arranged opposite from one another,
wherein the decorative layer is formed by a printed film, which is adhesively bonded to the carrier core with at least two layers of a bonding agent and an adhesive therebetween, the printed film at least partially covering at least the upper side and the substantially complete first and second side faces of the carrier core, towards the underside of the carrier core, and in that the protective layer is formed by a surface coating and bonded to the printed film and is covering a full surface area at least of the printed film connected to the carrier core,
wherein the first and second side faces are longer than the third and fourth side faces, and
wherein the first and second side faces of the carrier core are free of coupling profiles, and the first and second side faces each comprise a vertical side face portion,
wherein the vertical side face portion is covered by the printed film and the protective layer.

2. The area covering element according to claim 1, wherein the protective layer is formed by a transparent protective film.

3. The area covering element according to claim 1, wherein the printed film is visible through the protective layer.

4. The area covering element according to claim 1, wherein the underside of the carrier core is provided with at least one primer layer.

5. The area covering element according to claim 4, wherein said at least one primer layer is applied to the underside and to further sides of the carrier core.

6. The area covering element according to claim 4, wherein said at least one primer layer is a water-impermeable layer.

7. The area covering element according to claim 4, wherein said at least one primer layer is configured to protect the carrier core against the infestation of termites or other insects.

8. The area covering element according to claim 1, wherein said underside of the carrier core is free of said printed film.

9. The area covering element according to claim 1, wherein the printed film is a film printed by means of digital printing.

10. The area covering element according to claim 1, wherein the underside of the carrier core is provided with a backing layer.

11. The area covering element according to claim 1, wherein the printed film at least partially covers at least the upper side and the underside and the first and second side faces of the carrier core.

12. The area covering element according to claim 1, wherein the printed film completely covers the upper side and the underside and the first and second side faces of the carrier core.

13. The area covering element according to claim 1, wherein the printed film furthermore extends at least partially over oppositely arranged third and fourth side faces of the carrier core.

14. The area covering element according to claim 1, wherein the carrier material of the carrier core comprises a wood, a wood material, a plastic, a plastic composite material, a mineral plastic composite material or a mineral material.

15. The area covering element according to claim 1, wherein the printed film is produced from a plastic.

16. The area covering element according to claim 1, in which the area covering element is provided with at least one first coupling profile configured to co-act with a second coupling profile of an adjacent area covering element, in which the at least one first coupling profile is located at a third side face and/or a fourth side face of the area covering element.

17. The area covering element according to claim 1, wherein the protective layer is free of foamed material.

18. An area covering element comprising:
at least one carrier core,
at least one protective layer and a decorative layer arranged between the carrier core and the at least one protective layer,
the carrier core consisting of a strong, load-bearing carrier material and having at least an upper side and an underside arranged opposite from the upper side and at least a first and a second side face, arranged opposite from one another and respectively joining the upper side and the underside, and at least a third and a fourth side face, arranged opposite from one another,
wherein the decorative layer is formed by a printed film, which is firmly connected to the carrier core with a layer of an adhesive and a layer of a bonding agent, the bonding agent contacting the carrier core, the printed film at least partially covering at least the upper side and the substantially complete first and second side faces of the carrier core, towards the underside of the carrier core, and
the protective layer is formed by a surface coating and adhesively bonded to the printed film and is covering a full surface area at least of the printed film connected to the carrier core,
wherein the first and second side faces are longer than the third and fourth side faces, and
wherein the first and second side faces of the carrier core are free of coupling profiles, and
wherein the first and second side faces are connected to the underside of the carrier core via a bottom corner section, the printed film and the protective layer at least partially covering the bottom corner section.

19. The area covering element according to claim 18, wherein the first and second side faces form continuous planar faces.

20. The area covering element according to claim 18, wherein the bottom corner section is a rounded bottom corner section, wherein the rounded bottom corner section is at least partially covered by the printed film and the protective layer.

21. An area covering element comprising:
at least one carrier core,
at least one protective layer and
a decorative layer arranged between the carrier core and the at least one protective layer,
the carrier core consisting of a strong, load-bearing carrier material and having at least an upper side and an underside arranged opposite from the upper side and at least first and second side faces, arranged opposite from one another and respectively joining the upper side and the underside, and at least third and fourth side faces, arranged opposite from one another,
wherein the decorative layer is formed by a printed film, which is firmly connected to the carrier core with a layer of an adhesive and a layer of a bonding agent, the bonding agent contacting the carrier core, the printed film at least partially covering at least the upper side and the substantially complete first and second side faces of the carrier core, towards the underside of the carrier core,
the protective layer is formed by a transparent protective film having a thickness in the range from 70 μm to 300 μm and is covering a full surface area at least of the printed film connected to the carrier core, and
an adhesive substance at least partially coupling the protective layer to the printed film,
wherein the first and second side faces are longer than the third and fourth side faces, and
wherein the first and second side faces of the carrier core are free of coupling profiles, and the first and second side faces each comprise a vertical side face portion,
wherein the vertical side face portion is covered by the printed film and the protective layer.

\* \* \* \* \*